(12) United States Patent
Chang

(10) Patent No.: US 7,172,234 B2
(45) Date of Patent: Feb. 6, 2007

(54) SUPPORTING POST FOR MOTOR SHADE

(76) Inventor: Kuo Tang Chang, No. 189, Chong Qing Road, Hualien City (TW)

( * ) Notice: Subject to any disclaimer, the term of this patent is extended or adjusted under 35 U.S.C. 154(b) by 0 days.

(21) Appl. No.: 11/282,862

(22) Filed: Nov. 21, 2005

(65) Prior Publication Data
US 2006/0147257 A1    Jul. 6, 2006

(30) Foreign Application Priority Data
Dec. 30, 2004    (TW) .............................. 93221263 U

(51) Int. Cl.
B60J 1/20    (2006.01)
(52) U.S. Cl. .............. 296/95.1; 135/88.08; 296/136.12
(58) Field of Classification Search ............... 296/95.1, 296/136.12; 135/117, 88.01, 88.05
See application file for complete search history.

(56) References Cited

U.S. PATENT DOCUMENTS

| | | | | |
|---|---|---|---|---|
| 2,508,757 A | * | 5/1950 | Gray ........................ | 135/88.08 |
| 3,055,381 A | * | 9/1962 | Zielinski ................. | 296/136.12 |
| 3,068,046 A | * | 12/1962 | Bourgoin ................... | 296/95.1 |
| 3,870,061 A | * | 3/1975 | Lowery ................... | 135/88.07 |
| 4,164,233 A | * | 8/1979 | McAndrew ............... | 135/88.08 |
| 4,605,030 A | * | 8/1986 | Johnson .................... | 135/88.06 |
| 4,641,676 A | * | 2/1987 | Lynch ......................... | 135/145 |
| 4,655,236 A | * | 4/1987 | Dorame et al. .......... | 135/88.06 |
| 4,801,119 A | * | 1/1989 | Pelletier ................... | 135/88.12 |
| 4,809,725 A | * | 3/1989 | Champigny ................... | 135/75 |
| 5,241,977 A | * | 9/1993 | Flores et al. ................. | 135/119 |
| 5,437,298 A | * | 8/1995 | Lin ............................. | 135/117 |
| 5,660,425 A | * | 8/1997 | Weber ........................ | 296/163 |
| 5,765,821 A | * | 6/1998 | Janisse et al. ................ | 269/16 |
| D403,782 S | * | 1/1999 | James ......................... | D25/61 |

* cited by examiner

Primary Examiner—Kiran B. Patel

(57) ABSTRACT

A supporting post for motor shade includes a length-adjustable extendable post, a protective sleeve movably mounted on the extendable post, a movable fixing assembly mounted on the extendable post to provide an elastic tension, and a bottom seat with a universal joint connected to a lower end of the extendable post. The supporting post is upright erected beside a car with the movable fixing assembly elastically upward abutting on a lower edge of the car. The protective sleeve prevents the rigid extendable post from abrading the car, and the bottom seat with the universal joint allows the extendable post to stably stand on a rough or slope ground surface. A shade supported on four pieces of the extendable posts is distantly located above a car to effectively shield the car from sunlight, heat, and rainwater when the car is parked in an open-air place.

5 Claims, 6 Drawing Sheets

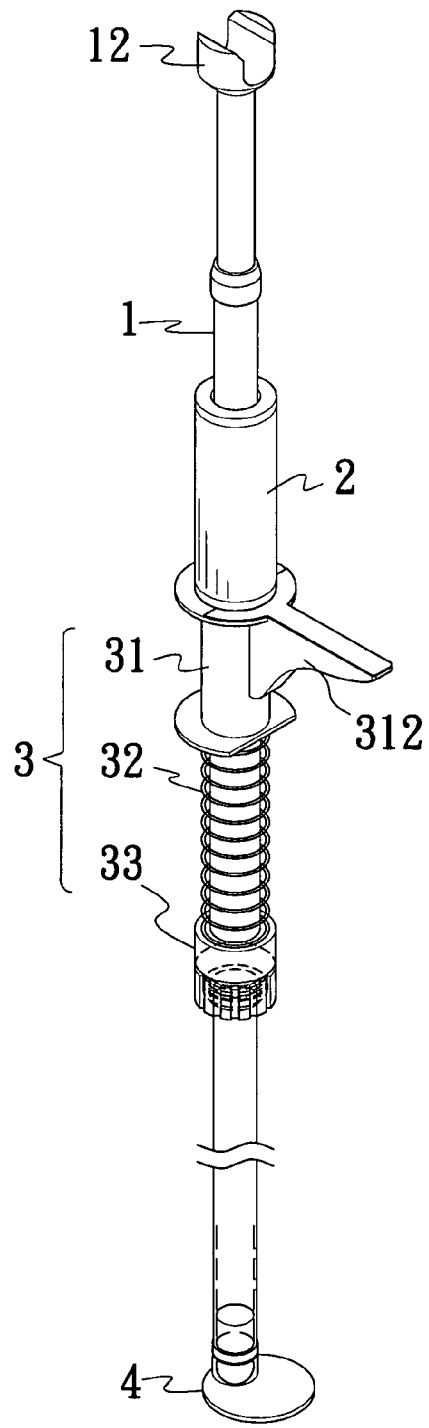
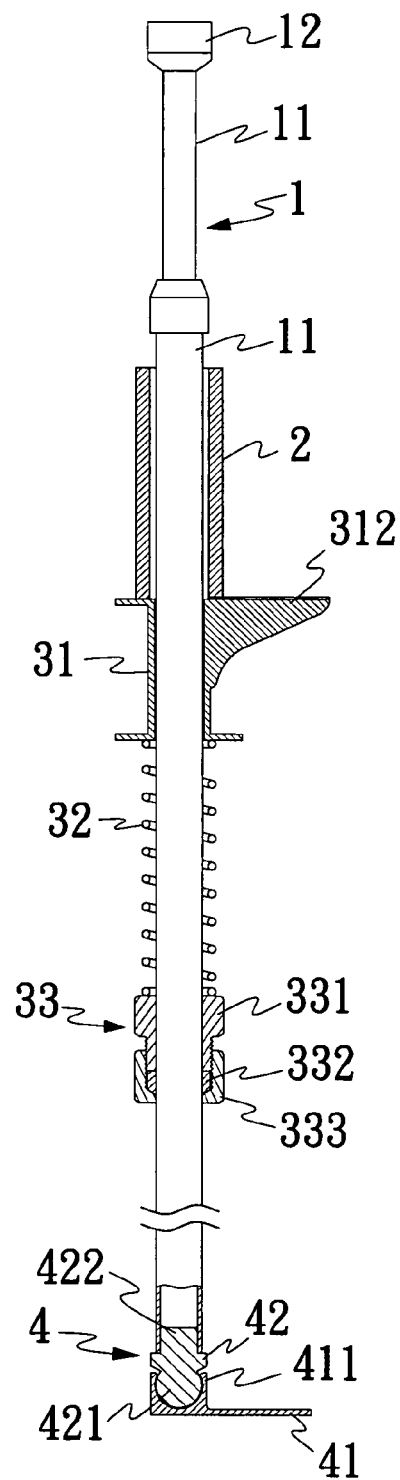
Fig. 2
Fig. 3

SUPPORTING POST FOR MOTOR SHADE

FIELD OF THE INVENTION

The present invention relates to a supporting post for motor shade, and more particularly to an extendable supporting post that can be conveniently erected beside a car for stably supporting a shade at a suitable height above the car roof.

BACKGROUND OF THE INVENTION

A conventional means for protecting a car from sunlight and rainwater is a car cover, which is made of canvas into a configuration similar to the car and has an elastic band provided a long a lower edge thereof, so as to enclose an entire car in the car cover. Another conventional means for protecting a car from sunlight is a collapsible sunshade that has a developed size similar to that of a windshield for mounting to an inner side of the windshield, so as to prevent sunlight from directly penetrating through the windshield into the car. While the conventional car cover is able to prevent sunlight from directly projecting on the car, it could not stop the heat from transmitting into the car. That is, the conventional car cover does not provide good thermal insulating effect. As to the conventional car sunshade, it does not block the sunlight from the car roof at all and is therefore useless in keeping the car at a low internal temperature.

Currently, people often drive cars to rural places for leisure activities, such as picnic and camping. The car is usually parked in an open-air place and becomes a center of the leisure activities. Therefore, it is desirable to have an easily operable and stably erected shade to effectively shield the car from sunlight and keep the interior of the car in a comfortable cool state. According to experiences, when the shade is supported over the car by a predetermined distance, the best sun blocking and thermal insulating effect can be obtained. Therefore, the developing of posts for easily and stably supporting a shade high above the car becomes an important issue.

SUMMARY OF THE INVENTION

A primary object of the present invention is to provide a supporting post that includes specially designed supporting structure to easily and stably support a shade at a suitable height above a car, so that a car parked in an open-air place is effectively shielded from sunlight, heat, and rainwater.

To achieve the above object, the supporting post for motor shade according to the present invention includes a length-adjustable extendable post having a U-shaped supporting bracket provided at a top thereof, a soft hollow protective sleeve movably mounted on the extendable post, a movable fixing assembly mounted on the extendable post to provide an axial elastic tension, and a bottom seat connected to a lower end of the extendable post. The movable fixing assembly includes a supporting element, an elastic element and a locating device sequentially mounted on the extendable post immediately below the protective sleeve.

The supporting post is upright erected beside a car with the movable fixing assembly elastically upward abutting on a lower edge of the car. The protective sleeve prevents the rigid extendable post from abrading the car, and the U-shaped supporting bracket at the top of the extendable post is able to support a transverse bar for the motor shade. A shade supported on the top of four pieces of the extendable posts is distantly located above a car to effectively shield the car from sunlight, heat, and rainwater when the car is parked in an open-air place.

The bottom seat includes a ground plate having an upward extended socket provided on an end thereof, and a universal joint having an upper column portion inserted into the lower end of the extendable post and a spherical portion fitted in the socket on the ground plate. With the universal joint, the ground plate could be freely adjusted to any angular position relative to the extendable post for the same to stably stand on a rough or slope ground.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein

FIG. 2 is an assembled perspective view of the supporting post for motor shade of FIG. 1;

FIG. 3 is an assembled sectional view of the supporting post for motor shade of FIG. 1;

DETAILED DESCRIPTION OF THE PREFERRED EMBODIMENTS

Figure 1:
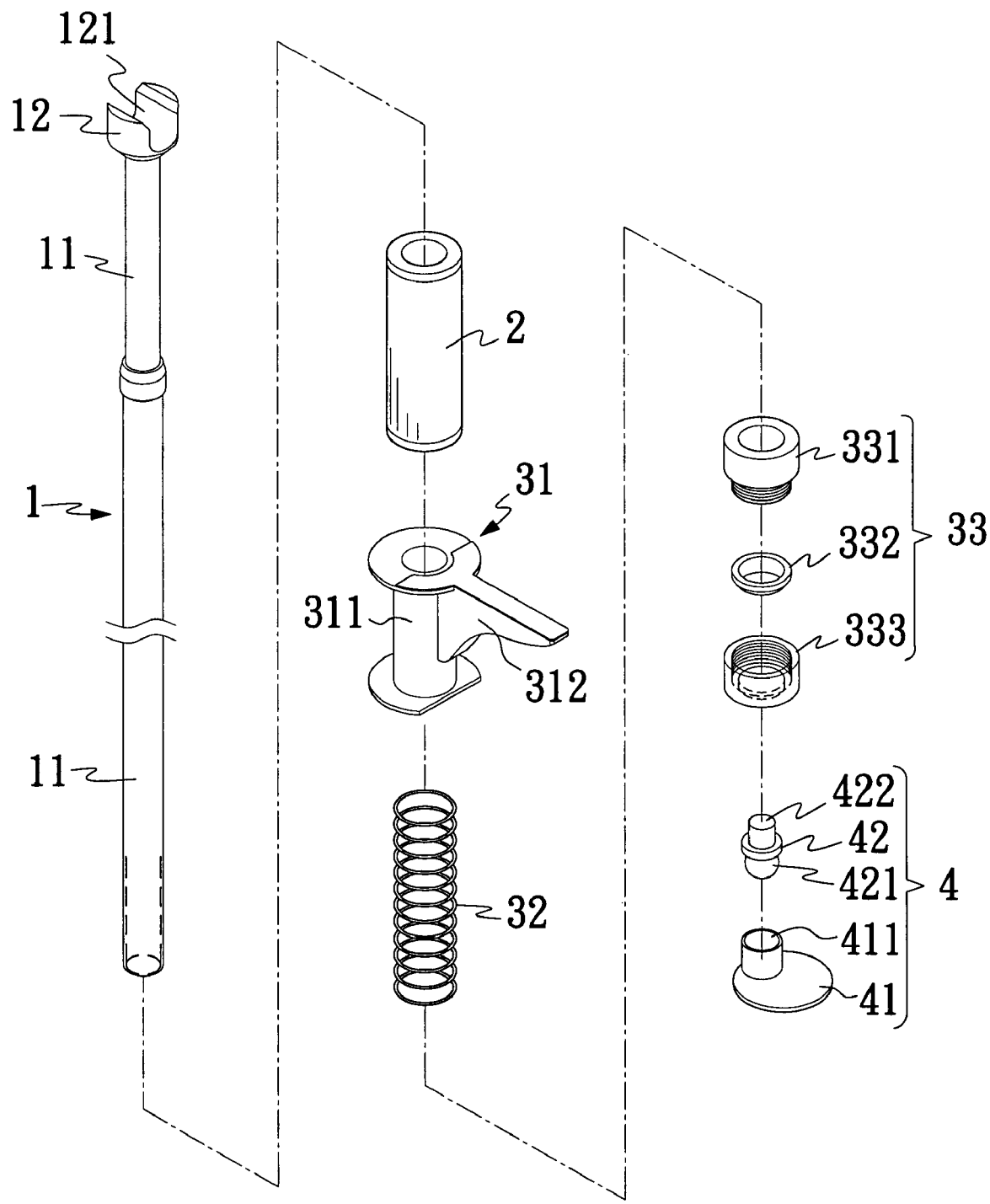
FIG. 1 is an exploded perspective view of a supporting post for motor shade according to the present invention.

Please refer to FIGS. 1 and 2 that are exploded and assembled perspective views, respectively, of a supporting post for motor shade according to the present invention, and to FIG. 3 that is an a sectional view of FIG. 2. As shown, the supporting post for motor shade according to the present invention includes an extendable post 1, a protective sleeve 2, a movable fixing assembly 3, and a bottom seat 4.

The extendable post 1 includes at least two hollow pipes 11, which are mutually axially connectable to each other by way of screwing together end to end, being internally provided with a spring, being provided at predetermined points with locking elements similar to that used on the shaft of a folding umbrella, or having an internally threaded collar provided at an end of one of the two pipes 11, so that the extendable post 1 is freely length-adjustable. A supporting bracket 12 defining a U-shaped space 121 is connected to an upper end of the extendable post 1 for supporting a transverse bar of the motor shade (not shown) thereon.

The protective sleeve 2 is a soft hollow member, such as a hollow cylinder, axially movably mounted on an outer wall of the extendable post 1.

The movable fixing assembly 3 includes a supporting element 31, an elastic element 32, and a locating device 33. The supporting element 31 includes a hollow sleeve 311 for mounting around the extendable post 1 and a supporting arm 312 sideward extended from one side of the hollow sleeve 311. The elastic element 32 may be any spring that generates elastic tension when being compressed. In the illustrated embodiment, the elastic element 32 is a compression coiled spring. The locating device 33 may be releasably locked to any point on the extendable post 1, and includes a hollow upper ring 331, a tension ring 322 made of an elastomer, and a lower ring 333. The upper ring 331 and the lower ring 333 may be screwed toward each other to compress the tension ring 332 positioned therebetween, so that the tension ring 332 is tightly forced against and thereby fixedly attached to the outer surface of the extendable post 1. However, it is understood any other means that could be discretionarily attached to the extendable post 1 are also acceptable for use in the present invention.

The bottom seat 4 is connected to a lower end of the extendable post 1 for the whole supporting post to stably stand on a ground surface without the risk of skidding. The bottom seat 4 is assembled from a ground plate 41 and a universal joint 42. The ground plate 41 is formed at an end with an upward extended socket 411, and the universal joint 42 includes a lower spherical portion 421 downward fitted in the socket 411 and an upper column portion 422 upward extended into the lower end of the extendable post 1, such that the ground plate 41 is allowed to freely turn to different angular positions relative to the extendable post 1.

To assemble the supporting post of the present invention, first mount the protective sleeve 2 around the extendable post 1 and axially move it to a desired height. Then, sequentially mount the supporting element 31, the elastic element 32, and the locating device 33 of the movable fixing assembly 3 on the extendable post 1 immediately below the protective sleeve 2 while keep the movable fixing assembly 3 in an axially movable state. Thereafter, mount the bottom seat 4 to the extendable post 1 with the upper column portion 422 of the universal joint 42 tightly fitted in the hollow lower end of the extendable post 1 to complete the supporting post for motor shade of the present invention.

Figure 4:
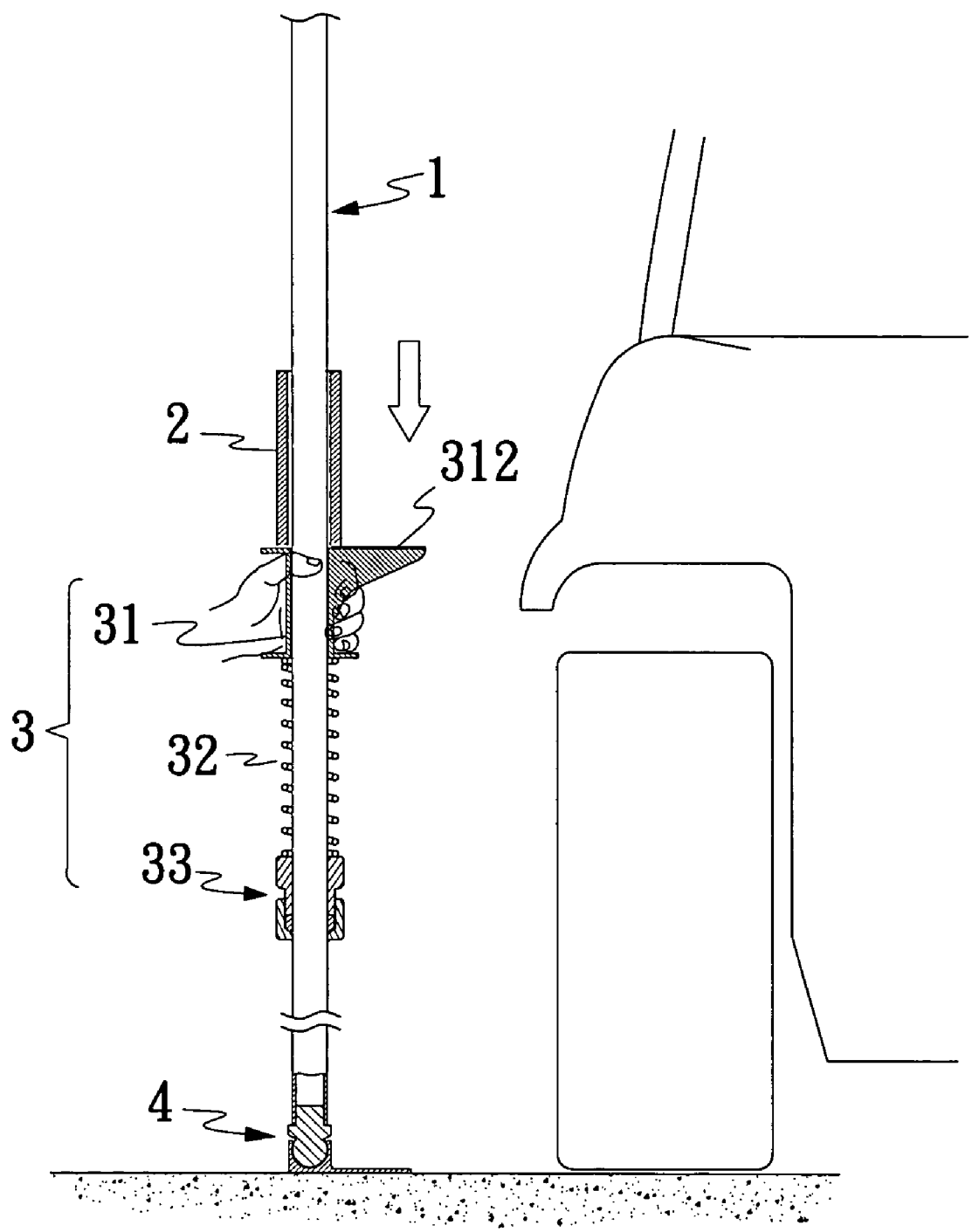
FIGS. 4 and 5 show the manner of erecting the supporting post for motor shade of the present invention.
Figure 5:
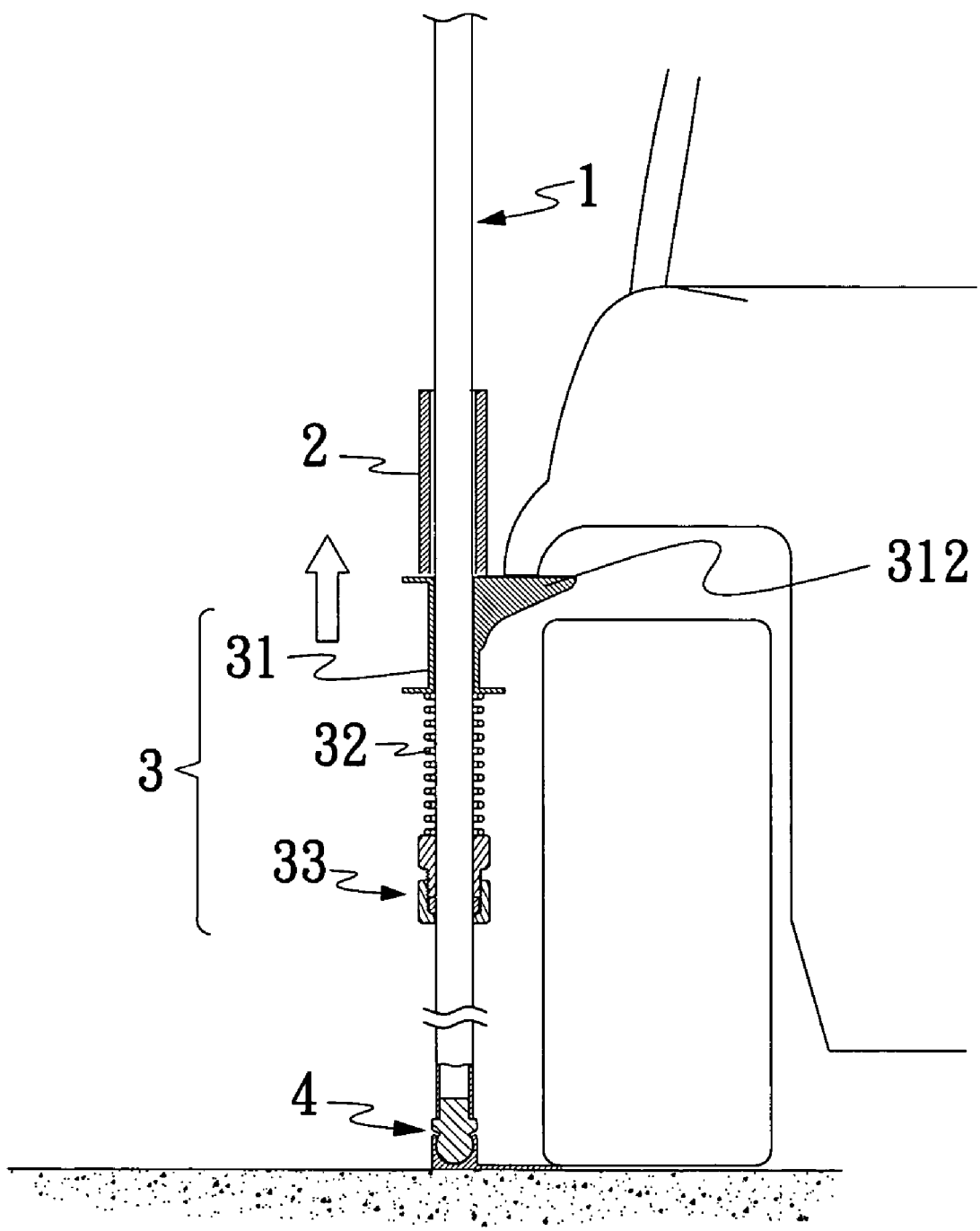
Figure 6:
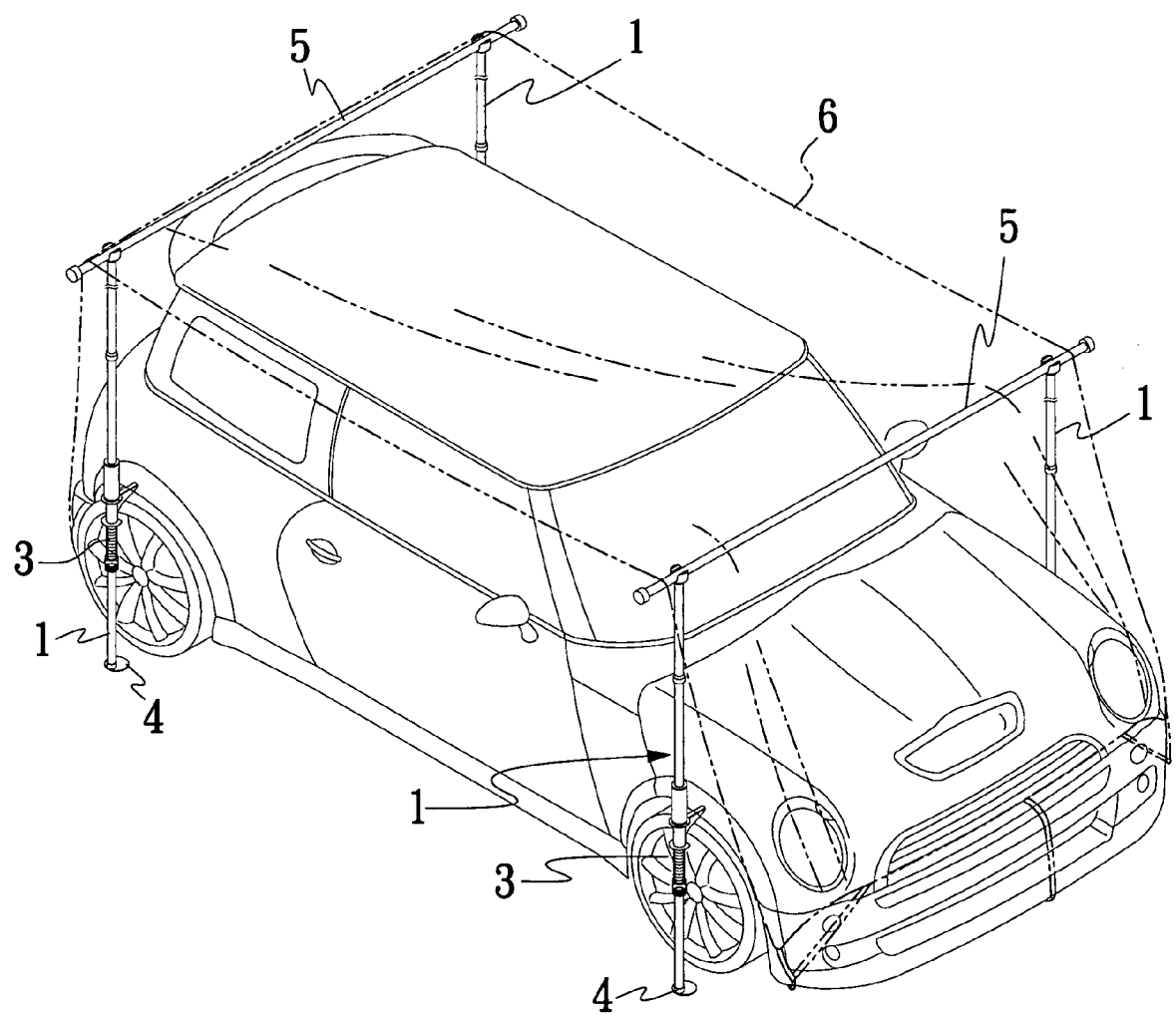
FIG. 6 shows a car parked below a motor shade supported using the supporting posts of the present invention.

Please refer to FIGS. 4 and 5. The supporting post of the present invention can be easily and conveniently erected to support a motor shade by taking advantage of a suitable position on a car. A user may pre-adjust the protective sleeve 2 and the movable fixing assembly 3 to a desired height, such that the supporting element 31 of the movable fixing assembly 3 is located below an area of the car, such as a lower edge of a fender as shown in FIGS. 4 and 5, against where the supporting arm 312 is abutted. The extendable post 1 is then moved to closely stand at one side of the car with the supporting arm 312 extended inward to locate below the fender. The whole movable fixing assembly 3 is then slid upward along the extendable post 1 until the elastic element 32 is brought into a compressed state to produce an elastic tension. At this point, the upper and the lower ring 331, 333 of the locating device 33 are manipulated to compress the tension ring 332 between them, so that the tension ring 332 is forced against and thereby tightly fitted around the outer surface of the extendable post 1. In this manner, the elastic tension produced by the elastic element 32 in the compressed state automatically pushes the supporting arm 312 of the supporting element 31 against the lower edge of the fender, allowing the extendable post 1 to stably stand beside the car. The protective sleeve 2 located above the supporting element 31 prevents the rigid extendable post 1 from abrading the car. After four pieces of the extendable posts 1 are erected in the above-described manner to stably stand beside four fenders of the car, two transverse bars 5 may be transversely mounted on the four supporting brackets 12 to support a shade 6 over the car, as shown in FIG. 6.

Since the shade 6 is supported by the extendable post 1 to locate above the car with a suitable distance left between the shade and the car roof, the car is effectively protected from exposing to direct sunlight, isolated from heat, and shielded from rainwater when the car is parked in an open-air place or stayed at some rural place for leisure activities. Unlike the conventional car cover and car sunshade, the motor shade 6 supported over the car allows the car to keep at a comfortable internal temperature.

Figure 7:
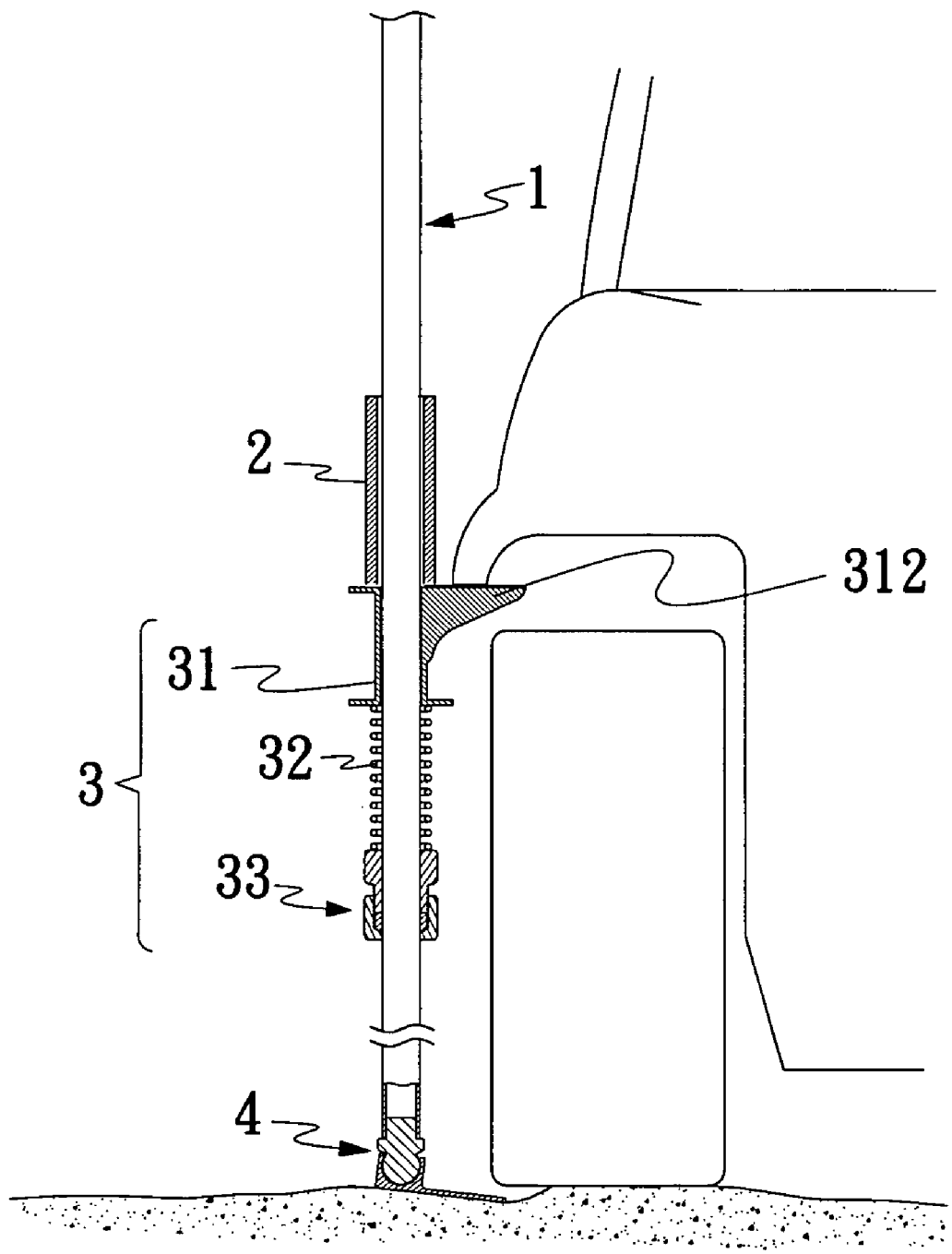
FIG. 7 is a fragmentary and partially sectional view showing the use of the supporting post for motor shade of the present invention on a rough ground surface.

Please refer to FIG. 7. When the car is parked on a rough ground surface or a slope, the ground plate 41 of the bottom seat 4 may be freely turned relative to the universal joint 42 to adapt to the bumps or the gradient in the ground, so that the extendable post 1 can always stably stand upright on the ground to support the shade 6.

What is claimed is:

1. A supporting post for motor shade, comprising:
   an extendable post having a freely adjustable overall length, and being provided at a top with a supporting bracket;
   a movable fixing assembly including a supporting element, an elastic element, and a locating device; said supporting element including a hollow sleeve for movably mounting around said extendable post, and a supporting arm sideward extended from one side of said hollow sleeve; said elastic element being mounted on said extendable post below said supporting element; and said locating device being axially movable along and discretionally fixed on said extendable post below said elastic element; and
   a ground seat being connected to a lower end of said extendable post;
   whereby when said supporting element of said movable fixing assembly is adjusted to a desired height on said extendable post and said locating device is fixed to a suitable position on said extendable post to compress said elastic element between said supporting element and said locating device, an elastic tension is produced by said compressed elastic element to firmly push said supporting arm upward.

2. The supporting post for motor shade as claimed in claim 1, further comprising a soft hollow protective sleeve being axially adjustably mounted on said extendable post immediately above said supporting element.

3. The supporting post for motor shade as claimed in claim 1, wherein said extendable post includes at least two hollow pipes connected to each other end to end, and wherein said supporting bracket defines a U-shaped space.

4. The supporting post for motor shade as claimed in claim 1, wherein said locating device includes an upper ring, a lower ring, and a tension ring positioned between said upper and said lower ring, whereby when said upper ring is screwed into said lower ring to compress said tension ring, said tension ring is forced against and thereby tightly attached to an outer surface of said extendable post to lock said locating device to said extendable post.

5. The supporting post for motor shade as claimed in claim 1, wherein said bottom seat includes a ground plate and a universal joint; said ground plate being formed at an end with an upward extended socket; and said universal joint including a lower spherical portion downward fitted in said socket on said ground plate, and an upper column portion upward extended into the lower end of said extendable post, such that said ground plate is freely turnable to different angular positions relative to said extendable post.

* * * * *